DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED DECEMBER 14, 1971

893 O.G. 404

T893,012
LIQUID-FILLED FUSE CUTOUT WITH EXPLOSION RESISTANT METAL COVER
Edward A. Vrabel, Pittsfield, Mass., assignor to General Electric Company
Filed Feb. 16, 1971, Ser. No. 115,255
Int. Cl. H01h *85/40*
U.S. Cl. 337—277
1 Sheet Drawing. 7 Pages Specification

A liquid-filled, fused circuit interrupter is provided having a fluid-holding container that is covered and sealed with a metal cover which is characterized by having a Brinell Hardness that is less than the Brinell Hardness of prior art oil-filled cutouts having equivalent high current interrupting ratings.

Dec. 14, 1971 E. A. VRABEL T893,012
LIQUID-FILLED FUSE CUTOUT WITH EXPLOSION RESISTANT METAL COVER
Filed Feb. 16, 1971
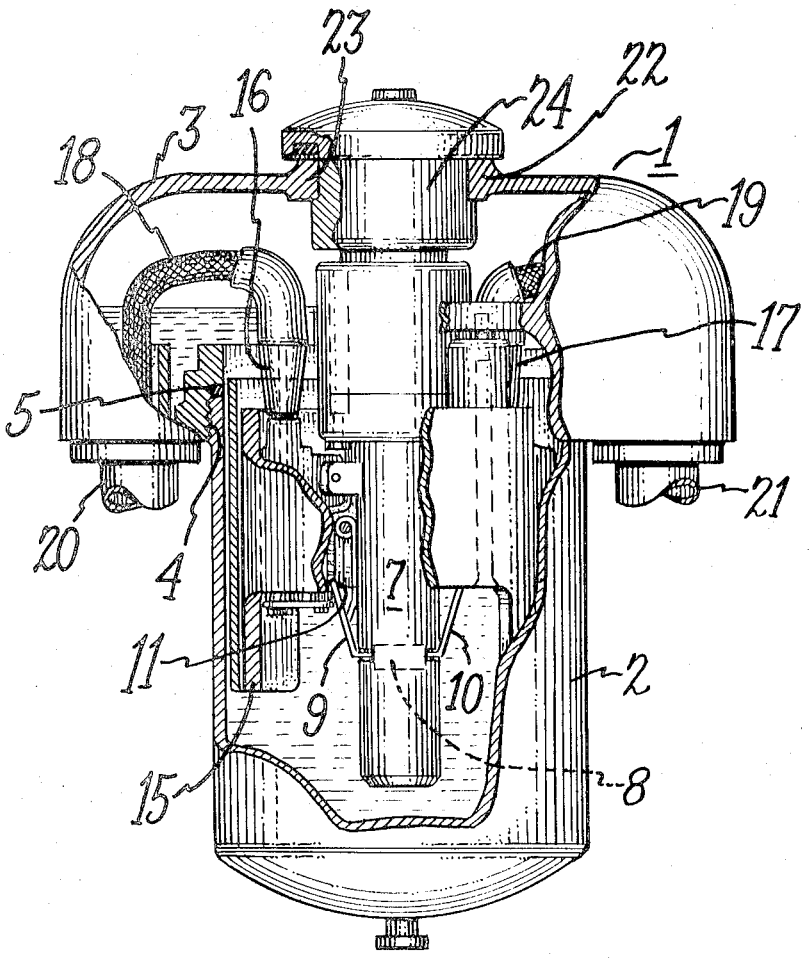
Inventor,
Edward A. Vrabel,
by Vale P. Myles
His Attorney.